United States Patent
Neuschaefer-Rube et al.

(10) Patent No.: US 10,281,344 B2
(45) Date of Patent: May 7, 2019

(54) ARRANGEMENT FOR MEASURING FORCE AND/OR TORQUE IN A HOLLOW FLANGE USING AT LEAST FOUR MAGNETIC SENSORS

(71) Applicant: Schaeffler Technologies AG & Co. KG, Herzogenaurach (DE)

(72) Inventors: Stephan Neuschaefer-Rube, Herzogenaurach (DE); Jan Matysik, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/541,224

(22) PCT Filed: Jan. 27, 2016

(86) PCT No.: PCT/DE2016/200048
§ 371 (c)(1),
(2) Date: Jun. 30, 2017

(87) PCT Pub. No.: WO2016/127987
PCT Pub. Date: Aug. 18, 2016

(65) Prior Publication Data
US 2017/0370784 A1    Dec. 28, 2017

(30) Foreign Application Priority Data
Feb. 9, 2015   (DE) ........................ 10 2015 202 239

(51) Int. Cl.
*G01L 1/12*      (2006.01)
*G01L 3/10*      (2006.01)

(52) U.S. Cl.
CPC ................ *G01L 1/125* (2013.01); *G01L 1/12* (2013.01); *G01L 3/10* (2013.01); *G01L 3/102* (2013.01)

(58) Field of Classification Search
CPC ... G01L 1/12; G01L 3/102; G01L 3/10; G01L 3/105; G01R 33/0029
See application file for complete search history.

(56) References Cited

U.S. PATENT DOCUMENTS

| 5,052,232 A | 10/1991 | Garshelis |
| 5,321,985 A | 6/1994 | Kashiwagi et al. |

(Continued)

FOREIGN PATENT DOCUMENTS

| CN | 1673700 A | 9/2005 |
| CN | 1704742 A | 12/2005 |

(Continued)

*Primary Examiner* — Lisa M Caputo
*Assistant Examiner* — Brandi N Hopkins
(74) *Attorney, Agent, or Firm* — Volpe and Koenig, P.C.

(57) ABSTRACT

An arrangement for measuring a force and/or a torque (Mt) on a machine element extending along an axial axis is disclosed. The machine element has a cavity and at least one magnetization region, extending circumferentially around the axial axis in an axial section. The arrangement further includes at least one first magnetic field sensor, a second magnetic field sensor, a third magnetic field sensor and a fourth magnetic field sensor, each of which is designed to individually measure an axial direction component of a magnetic field caused by the magnetization and also by the force or torque (Mt) and each of which lies in the axial section. At least the first magnetic sensor and the second magnetic sensor are arranged in the cavity of the machine element.

11 Claims, 3 Drawing Sheets

(56) References Cited

U.S. PATENT DOCUMENTS

| | | |
|---|---|---|
| 5,351,555 A | 10/1994 | Garshelis |
| 6,047,605 A | 4/2000 | Garshelis |
| 6,490,934 B2 | 12/2002 | Garshelis |
| 6,581,480 B1 | 6/2003 | May et al. |
| 6,810,754 B2 | 11/2004 | May |
| 7,126,355 B2 | 10/2006 | Seto |
| 8,001,849 B2 | 8/2011 | Weng |
| 8,087,304 B2 * | 1/2012 | Lee ................ G01R 33/07 324/207.11 |
| 8,191,431 B2 | 6/2012 | Hedayat et al. |
| 8,707,824 B2 | 4/2014 | Benkert et al. |
| 8,893,562 B2 | 11/2014 | Barraco et al. |
| 9,284,998 B2 * | 3/2016 | Gießibl ................ F16D 41/24 |
| 2005/0204831 A1 | 9/2005 | Mori et al. |
| 2007/0022809 A1 | 2/2007 | Yoshida et al. |
| 2011/0162464 A1 | 7/2011 | Weng |
| 2012/0296577 A1 | 11/2012 | Garshelis et al. |
| 2014/0298916 A1 | 10/2014 | Duan et al. |
| 2014/0360282 A1 * | 12/2014 | Gie Ibl ................ B60D 1/248 73/779 |
| 2014/0360285 A1 * | 12/2014 | Barraco ................ G01L 3/102 73/862.333 |

FOREIGN PATENT DOCUMENTS

| | | |
|---|---|---|
| CN | 101287978 A | 10/2008 |
| CN | 102519633 A | 6/2012 |
| DE | 69222588 | 5/1998 |
| DE | 60309678 | 9/2007 |
| DE | 69936138 | 2/2008 |
| DE | 69838904 | 1/2009 |
| EP | 2584331 | 4/2013 |
| EP | 2799827 | 5/2014 |
| EP | 2793009 | 10/2014 |
| WO | 9533982 | 12/1995 |
| WO | 0127638 | 4/2001 |
| WO | 2006053244 | 5/2006 |
| WO | 2007048143 | 4/2007 |
| WO | 2010037368 | 4/2010 |

\* cited by examiner

ARRANGEMENT FOR MEASURING FORCE AND/OR TORQUE IN A HOLLOW FLANGE USING AT LEAST FOUR MAGNETIC SENSORS

BACKGROUND

The present invention relates to an arrangement for measuring a force and/or a torque on a machine element extending along an axis with at least four magnetic field sensors using the inverse magnetostrictive effect.

From US 2012/0296577 A1, a magneto-elastic force sensor is known that is formed for the measurement of forces on an element that is magnetized circumferentially.

U.S. Pat. No. 5,321,985 teaches a magnetostrictive torque sensor in which a magnetostrictive layer is formed on the outer surface of a shaft and is positioned opposite excitation and detection coils. A torque acting on the shaft causes a material tension in the magnetostrictive layer, whereby its relative magnetic permeability changes as a function of direction. The magnetic field emerging from the magnetostrictive layer can be measured with the detection coils.

DE 699 36 138 T2 shows a magnetic force sensor in which a magnetized material is exposed to a bending moment, wherein the external magnetic field of the magnetized material can be determined with the help of a sensor arrangement.

From DE 603 09 678 T2, a method for detecting a torque in a shaft is known, in which magnetic fields are generated with alternating polarity that are measured with a sensor arrangement.

US 2007/0022809 A1 shows a device for the measurement of torques in which a layer is formed from a magnetostrictive material in a shaft.

From U.S. Pat. No. 5,052,232, a magneto-elastic torque sensor is known in which a machine element is provided with two circumferential magnetostrictive coatings.

From DE 698 38 904 T2, a torque sensor with a circular magnetization is known. The magnetization is formed in a ferromagnetic, magnetostrictive material of a shaft and extends in a circular shape about the shaft.

From DE 692 22 588 T2, a ring-shaped magnetized torque sensor is known.

WO 2007/048143 A2 teaches a sensor with a magnetized shaft.

WO 01/27638 A1 shows an acceleration sensor with a shaft that is magnetized circumferentially or longitudinally.

From WO 2006/053244 A2, a torque sensor is known that comprises a magnetization on a rotating shaft. The magnetization is formed circumferentially.

U.S. Pat. No. 8,191,431 B2 shows a sensor arrangement with a magnetized shaft.

EP 2 365 927 B1 shows a bottom bracket with two foot pedals and with a chain ring carrier that is connected to a shaft of the bottom bracket. The chain ring carrier is locked in rotation with a chain ring shaft that is connected, in turn, locked in rotation with the shaft. The chain ring shaft has a magnetization in some sections. A sensor is provided that detects a change in the magnetization in the event of a torque in the area of the magnetization.

U.S. Pat. No. 6,490,934 B2 teaches a magneto-elastic torque sensor for the measurement of a torque that acts on an element with a ferromagnetic, magnetostrictive, and magneto-elastic active area. This area is formed in a measurement transducer that sits, for example, on a shaft as a cylindrical sleeve. The torque sensor is opposite the measurement transducer.

From EP 0 803 053 B1, a torque sensor is known that comprises a magneto-elastic measurement transducer. The measurement transducer sits on a shaft as a cylindrical sleeve.

U.S. Pat. No. 8,893,562 B2 teaches a method for detecting a magnetic interference field for a torque measurement on a magneto-elastic shaft. Two signals are measured, wherein the second signal corresponds to the magnetic interference field and is subtracted from the first signal.

U.S. Pat. No. 8,001,849 B2 shows an arrangement for the magneto-elastic torque measurement in which the effect of external magnetic fields is to be compensated. The arrangement comprises a magnetized area of a shaft and also at least one passive and one active magnetic field sensor. The passive magnetic field sensors can be arranged on both sides of the magnetized area.

US 2011/0162464 A1 shows an arrangement for the magneto-elastic torque measurement in which the effect of equally shaped and unequally shaped magnetic fields is to be compensated. The arrangement comprises a magnetized area of a shaft and also at least three magnetic field sensors. The second and the third magnetic field sensor can be arranged next to the magnetized area.

U.S. Pat. No. 8,087,304 B2 shows a magneto-elastic torque sensor for the measurement of a torque acting on a shaft. The shaft has one or more circumferential magnetizations. FIG. 12 of U.S. Pat. No. 8,087,304 B2 shows an embodiment with only one circumferential magnetization, wherein two primary magnetic field sensors are arranged in the area of the magnetization and two secondary magnetic field sensors are arranged next to the area of the magnetization. FIG. 18 of U.S. Pat. No. 8,087,304 B2 shows an embodiment with two circumferential magnetizations that are polarized alternately, wherein also multiple magnetic field sensors are arranged at an axial transition between the two magnetizations. FIG. 8 of U.S. Pat. No. 8,087,304 B2 shows an embodiment with three circumferential magnetizations that are polarized alternately, wherein each magnetic field sensor is arranged in one of the areas of the three magnetizations. Through the special arrangement of the magnetic field sensors, the influence of magnetic interference fields is to be canceled.

SUMMARY

Starting from the prior art, the objective of the present invention is to expand the options for reducing the influence of magnetic interference fields on a measurement of forces and/or torques using the inverse magnetostrictive effect.

The specified objective is achieved by an arrangement according to one or more of the features described below according to the invention.

The arrangement according to the invention is used for measuring a force and/or a torque on a machine element extending along an axis. The force or the torque acts on the machine element, which leads to mechanical tension and the machine element is at least slightly deformed. The axis preferably forms a rotational axis of the machine element.

The machine element is hollow, due to it having a cavity extending at least partially into the axis. The cavity is formed, in particular, in the area of the axis. Preferably, the cavity extends over the entire axial length of the machine element. The cavity is preferably open at one axial end. It preferably has the shape of a cylinder.

The machine element has at least one magnetization area extending circumferentially about the axis in an axial section of the machine element for a magnetization formed in the machine element. Thus, there is at least one magnetization area surrounding the axis, wherein the axis itself preferably does not form a part of the magnetization area. The one magnetization area or the multiple magnetization areas have a tangential orientation with respect to a surface of the machine element extending about the axis. The one magnetization area or the multiple magnetization areas preferably have only a tangential orientation with respect to a surface of the machine element extending about the axis. The one magnetization area or the multiple magnetization areas preferably extend along a closed path about the axis, wherein the magnetization area or the magnetization areas may have short gaps. The one magnetization area or the multiple magnetization areas each form a primary sensor for determining the force or the torque. If multiple magnetization areas are formed, these preferably have an identical spatial extent and are axially spaced apart.

The arrangement further comprises at least one first magnetic field sensor, one second magnetic field sensor, one third magnetic field sensor, and one fourth magnetic field sensor, each of which form a secondary sensor for determining the force or the torque. The primary sensor, i.e., the at least one magnetization area, is used for converting the force to be measured or the torque to be measured into a corresponding magnetic field, while the secondary sensors enable the conversion of this magnetic field into electrical signals. The first magnetic field sensor, the second magnetic field sensor, the third magnetic field sensor, and the fourth magnetic field sensor are each formed for the individual measurement of an axial directional component of a magnetic field caused by the magnetization and also by the force and/or by the torque. The specified magnetic field occurs due to the inverse magnetostrictive effect. Thus, the measurement made possible with the arrangement according to the invention uses the inverse magnetostrictive effect. The specified axial directional component has a direction parallel to the axis.

The first magnetic field sensor, the second magnetic field sensor, the third magnetic field sensor, and the fourth magnetic field sensor are located together in the axial section of the magnetization area, if the machine element has only one magnetization area. The first magnetic field sensor, the second magnetic field sensor, the third magnetic field sensor, and the fourth magnetic field sensor are each located in one of the axial sections of the multiple magnetization areas, if the machine element has multiple magnetization areas. Thus, there is basically one of the magnetization areas at the axial positions of the first magnetic field sensor, the second magnetic field sensor, the third magnetic field sensor, and the fourth magnetic field sensor, wherein preferably two of the magnetic field sensors are arranged together in the axial section of one of the magnetization areas.

According to the invention, at least the first magnetic field sensor and the second magnetic field sensor are arranged in the cavity of the machine element, so that they are opposite an inner surface of the associated magnetization area and are formed for a measurement of the axial directional components of the magnetic field caused by the magnetization and also by the force and/or by the torque occurring in the cavity of the machine element.

One special advantage of the arrangement according to the invention is that it permits, in different constructions, a reliable reduction of the influence of magnetic interference fields on the measurement of forces and/or torques using the inverse magnetostrictive effect.

The one magnetization area or the multiple magnetization areas can be permanently or temporarily magnetized. In preferred embodiments of the arrangement according to the invention, the one magnetization area or the multiple magnetization areas are permanently magnetized, so that the magnetization is formed by a permanent magnetization. In alternative preferred embodiments of the arrangement according to the invention, this further has at least one magnet for magnetizing the at least one magnetization area, so that the magnetization of the at least one magnetization area is basically temporary. The at least one magnet can be formed by a permanent magnet or preferably by an electromagnet.

The one permanently or temporarily magnetized magnetization area or the multiple permanently or temporarily magnetized magnetization areas are preferably magnetically neutral to the outside of each magnetization area in a state of the machine element unloaded by a force or by a torque, so that no technically relevant magnetic field can be measured outside of the respective magnetization area.

The one magnetization area or the multiple magnetization areas each represent a part of the volume of the machine element. The one magnetization area or the multiple magnetization areas each preferably have a ring shape, wherein the axis of the machine element also forms a center axis of the respective ring shape. In an especially preferred way, the one magnetization area has or the multiple magnetization areas have the shape of a hollow cylinder coaxial to the axis of the machine element.

The machine element preferably further has magnetically neutral areas that are each arranged axially between the multiple magnetization areas and/or axially next to the at least one magnetization area of the machine element. The magnetically neutral areas do not have a permanent magnetization nor is the arrangement constructed to temporarily magnetize the magnetically neutral areas. Obviously, undesired magnetic interference fields could lead to temporary magnetization of the magnetically neutral areas. The magnetically neutral areas are preferably not magnetized.

The first magnetic field sensor, the second magnetic field sensor, the third magnetic field sensor, and the fourth magnetic field sensor are preferably arranged together in a plane encompassing the axis, in order to be able to reliably minimize the influence of magnetic interference fields on the measurement of forces and/or torques using the inverse magnetostrictive effect.

In preferred embodiments of the arrangement according to the invention, the first magnetic field sensor and the second magnetic field sensor are arranged opposite each other with respect to the axis and have an identical distance to the axis. Thus, the axis intersects a straight line connecting the first magnetic field sensor and the second magnetic field sensor in the center between the first magnetic field sensor and the second magnetic field sensor. The distance of the first magnetic field sensor from the axis and the distance of the second magnetic field sensor from the axis are preferably each small; in particular, smaller than half the outer radius of the machine element. The distance of the first magnetic field sensor from the axis and the distance of the second magnetic field sensor from the axis could also be zero.

In especially preferred embodiments of the arrangement according to the invention, the first magnetic field sensor and the second magnetic field sensor are arranged directly adjacent on both sides of the axis, so that the distance of the first magnetic field sensor to the axis and the distance of the second magnetic field sensor to the axis are technically minimal. Preferably, the first magnetic field sensor and the second magnetic field sensor are arranged on a front and reverse side of a circuit board.

In preferred embodiments of the arrangement according to the invention, the third magnetic field sensor and the fourth magnetic field sensor are arranged opposite each other with respect to the axis and have an identical distance to the axis. Thus, the axis intersects a straight line connecting the third magnetic field sensor and the fourth magnetic field sensor at the center between the third magnetic field sensor and the fourth magnetic field sensor. The distance of the third magnetic field sensor from the axis and the distance of the fourth magnetic field sensor from the axis are preferably each greater than the distance of the first magnetic field sensor from the axis and the distance of the second magnetic field sensor from the axis. The distance of the third magnetic field sensor from the axis and the distance of the fourth magnetic field sensor from the axis are preferably each more than twice as large as the distance of the first magnetic field sensor from the axis and the distance of the second magnetic field sensor from the axis. Therefore, the first magnetic field sensor and the second magnetic field sensor are preferably magnetic field sensors arranged radially on the inside, while the third magnetic field sensor and the fourth magnetic field sensor are preferably magnetic field sensors arranged radially on the outside, wherein the attribute "outside" is with respect to the distance to the axis and is not a statement on the arrangement of the magnetic field sensors inside or outside the cavity. In each of the axial sections of the magnetization areas, the number of radially inner magnetic field sensors preferably equals the number of radially outer magnetic field sensors.

The third magnetic field sensor and the fourth magnetic field sensor are preferably arranged on an inner surface or on an outer surface of the machine element, wherein an air gap is formed between the third magnetic field sensor and the inner or outer surface of the machine element, and wherein an air gap is formed between the fourth magnetic field sensor and the inner or outer surface of the machine element. The inner surface of the machine element is formed in its cavity. The outer surface of the machine element is formed on its outer shape. The air gap is preferably less than 5 mm, in an especially preferred way less than 1 mm. The air gaps are preferably the same size.

The third magnetic field sensor and the fourth magnetic field sensor can be arranged both in the cavity of the machine element and also outside of the hollow machine element.

In another preferred embodiment of the arrangement according to the invention, the machine element has two magnetization areas extending circumferentially about the axis for a magnetization. Here, the first magnetic field sensor and the third magnetic field sensor are arranged at an axial position of the second magnetization area, while the second magnetic field sensor and the fourth magnetic field sensor are arranged at an axial position of the first magnetization area. In this embodiment, the first magnetic field sensor, the second magnetic field sensor, the third magnetic field sensor, and the fourth magnetic field sensor are also preferably arranged in a plane encompassing the axis. In this embodiment, the first magnetization area and the second magnetization area preferably have the same polarity, i.e., identical orientation. The plane encompasses the axis because the axis is in the plane.

The four magnetic field sensors are preferably arranged and wired for determining the force to be measured or the torque to be measured such that a difference from the sum of the axial directional components that can be measured with the first magnetic field sensor and with the second magnetic field sensor and the sum of the axial directional components that can be measured with the third magnetic field sensor and with the fourth magnetic field sensor can be determined. The mentioned axial directional components are the axial directional components of the magnetic field that is caused by the magnetization and also by the force and/or by the torque and over which a magnetic interference field can be superimposed. The mentioned sum and difference formation can be realized such that, for example, the magnetic field sensors forming a subtrahend are aligned opposite the magnetic field sensors forming a minuend. The mentioned sum and difference formation can also be realized, however, such that the magnetic field sensors have the same orientation and a sum is formed from their signals, wherein the magnetic field sensors forming a subtrahend are reverse polarized.

Additional preferred embodiments of the arrangement according to the invention comprise two or more of the quadruple of magnetic field sensors described above. The magnetic field sensors of the additional quadruple are located at the axial positions of additional magnetization areas and differ preferably only in their axial position of the first to fourth magnetic field sensor.

In one of these additional preferred embodiments, the machine element comprises two of the magnetization areas extending circumferentially about the axis for a magnetization. The arrangement further comprises a fifth magnetic field sensor, a sixth magnetic field sensor, a seventh magnetic field sensor, and an eighth magnetic field sensor, each of which are formed for the individual measurement of an axial directional component of a magnetic field caused by the magnetization and also by the force and/or by the torque. The first magnetic field sensor, the second magnetic field sensor, the third magnetic field sensor, and the fourth magnetic field sensor are arranged at an axial position of the first magnetization area. The fifth magnetic field sensor, the sixth magnetic field sensor, the seventh magnetic field sensor, and the eighth magnetic field sensor are arranged at an axial position of the second magnetization area. The fifth magnetic field sensor has an identical radial position and an identical tangential position as the first magnetic field sensor. The sixth magnetic field sensor has an identical radial position and an identical tangential position as the second magnetic field sensor. The seventh magnetic field sensor has an identical radial position and an identical tangential position as the third magnetic field sensor. The eighth magnetic field sensor has an identical radial position and an identical tangential position as the fourth magnetic field sensor.

In this embodiment, the magnetic field sensors are preferably arranged and wired such that a first difference from the sum of the axial directional components that can be measured with the first magnetic field sensor and with the second magnetic field sensor and the sum of the axial directional components that can be measured with the third magnetic field sensor and with the fourth magnetic field sensor can be determined. Accordingly, a second difference from the sum of the axial directional components that can be measured with the fifth magnetic field sensor and with the sixth magnetic field sensor and the sum of the axial directional components that can be measured with the seventh magnetic field sensor and with the eighth magnetic field sensor can be determined.

If the first magnetization area and the second magnetization area have an identical polarity, i.e., identical orientation, preferably a sum can be determined from the first difference and the second difference, in order to determine the force to be measured or the torque to be measured.

If the first magnetization area and the second magnetization area have opposite polarities, i.e., reverse orientation, preferably a difference can be determined from the first difference and the second difference, in order to determine the force to be measured or the torque to be measured.

According to the second magnetization area and the second quadruple of magnetic field sensors, the arrangement according to the invention can comprise additional magnetization areas and additional quadruples of magnetic field sensors. Thus, in additional preferred embodiments, the machine element has one or more additional magnetization areas extending circumferentially about the axis for a magnetization at whose axial position additional four magnetic field sensors are arranged. The tangential positions and the radial positions of these additional four magnetic field sensors are preferably equal to those of the first to fourth magnetic field sensors. The additional four magnetic field sensors are preferably wired and arranged like the first to fourth magnetic field sensors, whereby an additional difference can be determined. The polarities of the additional magnetization areas can be selected arbitrarily.

The one magnetization area or the multiple magnetization areas preferably each have a high magnetostrictive effect.

If there are multiple magnetization areas, these are preferably arranged axially spaced apart relative to each other, wherein a magnetically neutral area is arranged between two adjacent magnetization areas. If there are more than two magnetization areas, these preferably each have the same distance to each other.

The machine element preferably has the outer shape of a prism or a cylinder, wherein the prism or the cylinder is arranged coaxial to the axis. The prism or the cylinder is preferably straight. In an especially preferred way, the machine element has the outer shape of a straight circular cylinder, wherein the circular cylinder is arranged coaxial to the axis. In special embodiments, the prism or the cylinder has a conical construction. If the cavity extends over the entire axial length of the machine element, it preferably has the shape of a hollow cylinder.

The machine element is preferably formed by a partially hollow shaft, a hollow shaft, an at least partially hollow switching fork, or a hollow flange. The partially hollow shaft, the hollow shaft, the partially hollow switching fork, or the hollow flange can be designed for loads due to different forces and torques and can be, for example, a component of a sensor bottom bracket, a roll stabilizer, or a manure distributor. In principle, the machine element could also be formed by completely different types of machine elements.

The at least four magnetic field sensors are preferably each formed by a semiconductor sensor. The at least four magnetic field sensors are alternatively formed by Hall sensors, coils, flux gates, or flux gate magnetometers. In principle, other sensor types could also be used if they are suitable for measuring an axial directional component of the magnetic field caused by the inverse magnetostrictive effect.

BRIEF DESCRIPTION OF THE DRAWINGS

Other details, advantages, and refinements of the invention are disclosed from the following description of preferred embodiments of the invention with reference to the drawing. Shown are.

DETAILED DESCRIPTION OF THE PREFERRED EMBODIMENTS

FIG. 1 to FIG. 5 show an arrangement according to the invention each in two views. The left parts of the figures each comprise a cross-sectional view, while the right parts of the figures each comprise a top view of the respective embodiment of the arrangement according to the invention.

Figure 1:
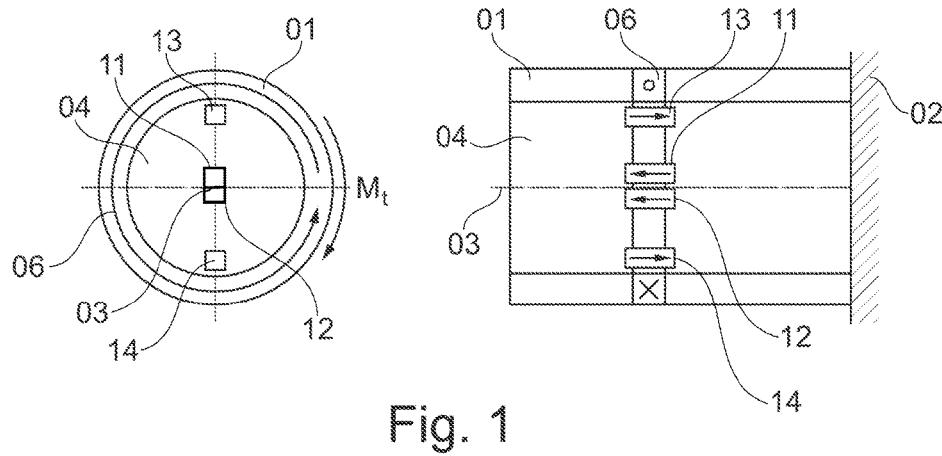
FIG. 1 a first preferred embodiment of an arrangement according to the invention with four magnetic field sensors, FIG. 2 a second preferred embodiment of the arrangement according to the invention with four magnetic field sensors, FIG. 3 a third preferred embodiment of the arrangement according to the invention with four magnetic field sensors and two magnetization areas, FIG. 4 a fourth preferred embodiment of the arrangement according to the invention with eight magnetic field sensors and two magnetization areas, and FIG. 5 a fifth preferred embodiment of the arrangement according to the invention with eight magnetic field sensors and two magnetization areas.

FIG. 1 shows a first preferred embodiment of the arrangement according to the invention. The arrangement comprises first a machine element in the form of a hollow flange 01 that is mounted on a base body 02. A force or a torque, in particular, a torque Mt, acts on the hollow flange 01. The hollow flange 01 has the shape of a hollow circular cylinder. The hollow flange 01 extends along an axis 03 that also forms the center axis of the hollow cylindrical shape of the hollow flange 01. A cylindrical cavity 04 is formed in the interior of the hollow flange 01. The hollow flange 01 is formed of a magneto-elastic material that has the magnetostrictive effect.

In an axial section of the hollow flange 01 there is a first permanent magnetization area 06 that extends circumferentially about the axis 03, i.e., it is circular permanent magnetization.

This embodiment of the arrangement according to the invention further comprises a first magnetic field sensor 11, a second magnetic field sensor 12, a third magnetic field sensor 13, and a fourth magnetic field sensor 14. The magnetic field sensors 11, 12, 13, 14 are each formed for the individual measurement of an axial directional component of a magnetic field cause by the magnetization of the permanent magnetization area 06 and by the force and/or by the torque. The magnetic field sensors 11, 12, 13, 14 are arranged in a plane that also comprises the axis 03. The magnetic field sensors 11, 12, 13, 14 have an identical axial position that lies within the axial section of the hollow flange 01 in which the permanent magnetization area 06 is formed. The magnetic field sensors 11, 12, 13, 14 are located in the cavity 04.

The first magnetic field sensor 11 and the second magnetic field sensor 12 are arranged on an axis 03 and are located directly above and below the axis 03. The first magnetic field sensor 11 and the second magnetic field sensor 12 are arranged, in particular, on a top side and a bottom side of a circuit board (not shown). The first magnetic field sensor 11 and the second magnetic field sensor 12 have a technically minimum distance to the axis 03 that is equal in these two magnetic field sensors 11, 12.

The third magnetic field sensor 13 and the fourth magnetic field sensor 14 are arranged on the inner surface of the hollow flange 01. The third magnetic field sensor 13 and the fourth magnetic field sensor 14 have an equal distance to the axis 03. The first magnetic field sensor 11 and the second magnetic field sensor 12 are each polarized opposite the third magnetic field sensor 13 and the fourth magnetic field sensor 14.

Figure 2:
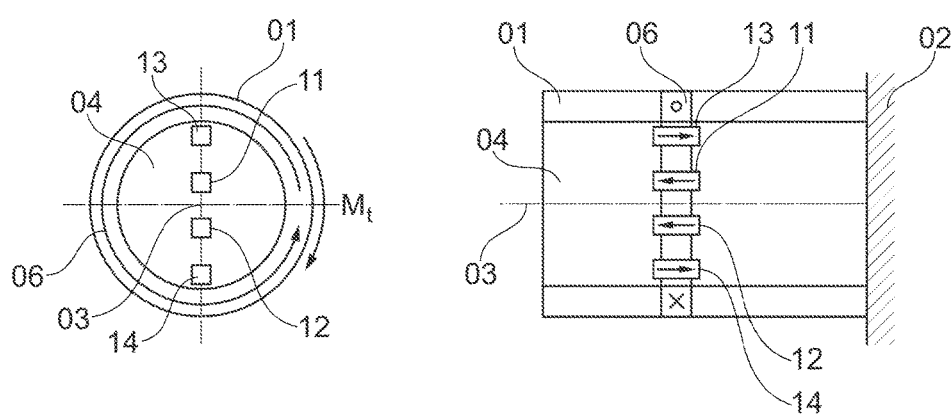

FIG. 2 shows a second preferred embodiment of the arrangement according to the invention. This second embodiment differs from the embodiment shown in FIG. 1 only in that the first magnetic field sensor 11 and the second magnetic field sensor 12 are not arranged directly on the axis 03, but instead have a slight distance to the axis 03.

Figure 3:
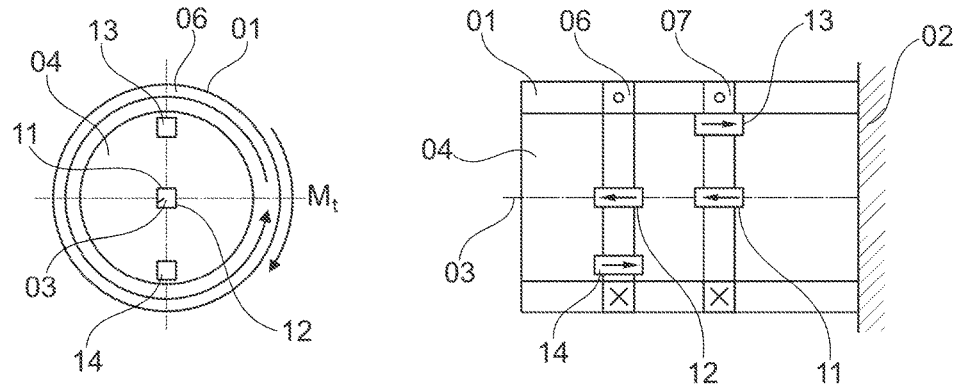

FIG. 3 shows a third preferred embodiment of the arrangement according to the invention. This third embodiment differs from the embodiment shown in FIG. 1 only in the number of permanent magnetization areas and in the axial arrangement of the magnetic field sensors. In the embodiment shown in FIG. 3, the hollow flange 01 has, next to the first permanent magnetization area 06, a second permanent magnetization area 07 that is located in another axial section of the hollow flange 01 and is arranged axially spaced apart from the first permanent magnetization area 06. For the rest, the first permanent magnetization area 06 and the second permanent magnetization area 07 are identical. In particular, the two permanent magnetization areas 06, 07 have an identical polarity. In contrast to the embodiment shown in FIG. 1, the first magnetic field sensor 11 and the third magnetic field sensor 13 have a deviating axial position, because the first magnetic field sensor 11 and the third magnetic field sensor 13 are arranged at an axial position of the second permanent magnetization area 07.

Figure 4:
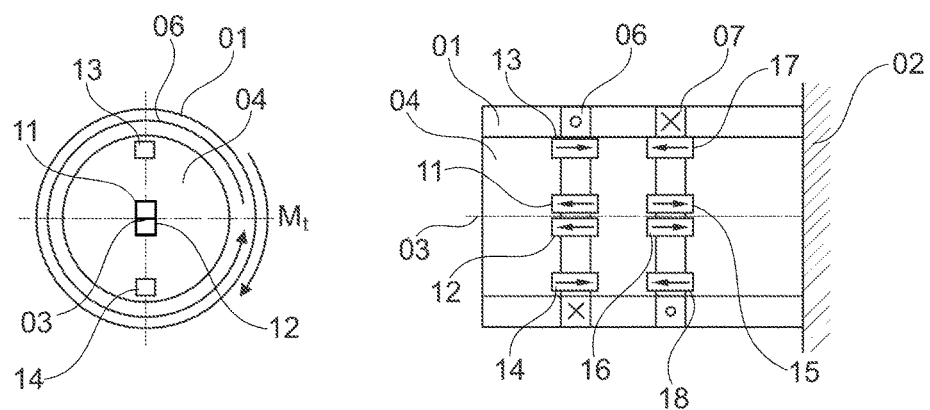

FIG. 4 shows a fourth preferred embodiment of the arrangement according to the invention. This fourth embodiment differs from the embodiment shown in FIG. 1 only in the number of permanent magnetization areas and in the number of magnetic field sensors. In the embodiment shown in FIG. 4, the hollow flange 01 has, next to the first permanent magnetization area 06, a second permanent magnetization area 07 that is located in another axial section of the hollow flange 01 and is arranged axially spaced apart from the first permanent magnetization area 06. For the rest, the first permanent magnetization area 06 and the second permanent magnetization area 07 are identical, but the two permanent magnetization areas 06, 07 have different polarities.

The embodiment shown in FIG. 4 further has a fifth magnetic field sensor 15, a sixth magnetic field sensor 16, a seventh magnetic field sensor 17, and an eighth magnetic field sensor 18 that are identical with respect to their construction and their radial and tangential positions to the first magnetic field sensor 11, the second magnetic field sensor 12, the third magnetic field sensor 13, and the fourth magnetic field sensor 14. However, the fifth magnetic field sensor 15, the sixth magnetic field sensor 16, the seventh magnetic field sensor 17, and the eighth magnetic field sensor 18 have an axial position of the second permanent magnetization area 07.

Because the two permanent magnetization areas 06, 07 have different polarities, the fifth magnetic field sensor 15 and the sixth magnetic field sensor 16 are each polarized opposite the first magnetic field sensor 11 and the second magnetic field sensor 12. Likewise, the seventh magnetic field sensor 17 and the eighth magnetic field sensor 18 are each polarized opposite the third magnetic field sensor 13 and the fourth magnetic field sensor 14.

Figure 5:
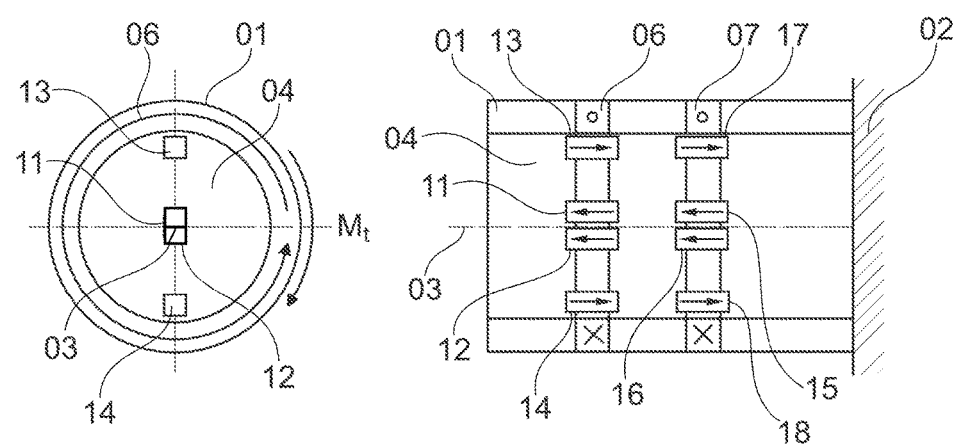

FIG. 5 shows a fifth preferred embodiment of the arrangement according to the invention. This fifth embodiment differs from the embodiment shown in FIG. 4 only in the polarity of the permanent magnetization areas and in the polarization of the magnetic field sensors. In the embodiment shown in FIG. 5, the first permanent magnetization area 06 and the second permanent magnetization area 07 have an identical polarity. For this reason, the fifth magnetic field sensor 15 and the sixth magnetic field sensor 16 are polarized like the first magnetic field sensor 11 and the second magnetic field sensor 12. Likewise, the seventh magnetic field sensor 17 and the eighth magnetic field sensor 18 are polarized like the third magnetic field sensor 13 and the fourth magnetic field sensor 14.

REFERENCE NUMBERS

01 Hollow flange
02 Base body
03 Axis
04 Cavity
05 -
06 First permanent magnetization area
07 Second permanent magnetization area
08 -
09 -
11 First magnetic field sensor
12 Second magnetic field sensor
13 Third magnetic field sensor
14 Fourth magnetic field sensor
15 Fifth magnetic field sensor
16 Sixth magnetic field sensor
17 Seventh magnetic field sensor
18 Eighth magnetic field sensor

The invention claimed is:

1. An arrangement for measuring at least one of a force or a torque (Mt) on a machine element that extends along an axial axis, the arrangement comprising:
   a cavity defined in the machine element and extending along the axial axis;
   at least one magnetization area extending circumferentially about the axial axis in an axial section of the machine element for a magnetization;
   at least one first magnetic field sensor, one second magnetic field sensor, one third magnetic field sensor, and one fourth magnetic field sensor each of which is formed for individual measurement of an axial directional component of a magnetic field caused by the magnetization and also by at least one of the force or the torque (Mt) and is located in the axial section of the one magnetization area or in one of the axial sections of the multiple magnetization areas;
   at least the first magnetic field sensor and the second magnetic field sensor are arranged in the cavity of the machine element; and
   the first magnetic field sensor and the second magnetic field sensor are arranged at a first radial distance from the axial axis,
   the third magnetic field sensor and the fourth magnetic field sensor are arranged at a second radial distance from the axial axis, and
   the second radial distance is greater than the first radial distance.

2. The arrangement according to claim 1, wherein the first magnetic field sensor, the second magnetic field sensor, the third magnetic field sensor, and the fourth magnetic field sensor are arranged in a radially extending plane encompassing the axial axis.

3. The arrangement according to claim 1, wherein the first magnetic field sensor and the second magnetic field sensor are arranged opposite each other with respect to the axial axis and have an identical distance to the axial axis.

4. An arrangement according to claim 3, wherein the first magnetic field sensor and the second magnetic field sensor are arranged directly adjacent on both sides of the axial axis.

5. An arrangement according to claim 3, wherein the third magnetic field sensor and the fourth magnetic field sensor are arranged opposite each other with respect to the axial axis and have an identical distance to the axial axis.

6. The arrangement according to claim 1, wherein the third magnetic field sensor and the fourth magnetic field sensor are arranged on an inner or outer surface of the machine element, an air gap is formed between the third magnetic field sensor and the inner or outer surface of the machine element, and an air gap is formed between the fourth magnetic field sensor and the inner or outer surface of the machine element.

7. The arrangement according to claim 1, wherein the machine element has two of the magnetization areas extending circumferentially about the axial axis for magnetization, the first magnetic field sensor and the third magnetic field sensor are arranged at an axial position of the second magnetization area and the second magnetic field sensor and the fourth magnetic field sensor are arranged at an axial position of the first magnetization area.

8. The arrangement according to claim 1, wherein the magnetic field sensors are arranged and wired such that a difference from a sum of axial directional components that are measured with the first magnetic field sensor and with the second magnetic field sensor and a sum of axial directional components that are measured with the third magnetic field sensor and with the fourth magnetic field sensor is determined.

9. The arrangement according to claim 1, wherein the machine element has two of the magnetization areas extending circumferentially about the axial axis for magnetization and the arrangement further comprises:
a fifth magnetic field sensor, a sixth magnetic field sensor, a seventh magnetic field sensor, and an eighth magnetic field sensor;
the first magnetic field sensor, the second magnetic field sensor, the third magnetic field sensor, and the fourth magnetic field sensor are arranged at an axial position of the first magnetization area;
the fifth magnetic field sensor, the sixth magnetic field sensor, the seventh magnetic field sensor, and the eighth magnetic field sensor are arranged at an axial position of the second magnetization area;
the fifth magnetic field sensor has an identical radial position and an identical tangential position as the first magnetic field sensor;
the sixth magnetic field sensor has an identical radial position and an identical tangential position as the second magnetic field sensor;
the seventh magnetic field sensor has an identical radial position and an identical tangential position as the third magnetic field sensor; and
the eighth magnetic field sensor has an identical radial position and an identical tangential position as the fourth magnetic field sensor.

10. The arrangement according to claim 1, wherein the first radial distance is less than half of an outer radius of the machine element.

11. An arrangement for measuring at least one of a force or a torque (Mt) on a machine element that extends along an axial axis, the arrangement comprising:
a cavity defined in the machine element and extending along the axial axis;
at least one magnetization area extending circumferentially about the axial axis in an axial section of the machine element for a magnetization;
a first magnetic field sensor, a second magnetic field sensor, a third magnetic field sensor, and a fourth magnetic field sensor each for individual measurement of an axial directional component of a magnetic field caused by the magnetization and by at least one of the force or the torque and is located in the axial section of the one magnetization area or in one of the axial sections of the multiple magnetization areas;
the first magnetic field sensor and the second magnetic field sensor are arranged at a first identical radial distance to the axial axis;
the third magnetic field sensor and the fourth magnetic field sensor are arranged at a second identical radial distance to the axial axis; and
the first magnetic field sensor, the second magnetic field sensor, the third magnetic field sensor, and the fourth magnetic field sensor are each:
(i) intersected by a single straight line extending radially through the axial axis, and
(ii) arranged in the cavity of the machine element.

* * * * *